INVENTOR.
MARTIN P. WOLPIN
BERT SMITH, JR.
WALTER P. KISTLER
BY
Bean, Brooks, Buckley & Bean.
ATTORNEYS

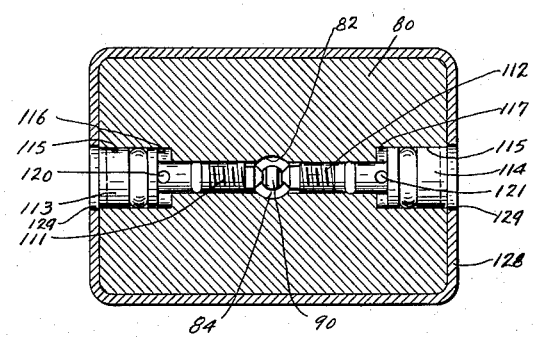

United States Patent Office 3,209,782
Patented Oct. 5, 1965

3,209,782
FLAPPER VALVES
Martin P. Wolpin, Tonawanda, Bert Smith, Jr., Williamsville, and Walter P. Kistler, Niagara Falls, N.Y., assignors to Bell Aerospace Corporation, Buffalo, N.Y., a corporation of Delaware
Filed May 25, 1955, Ser. No. 511,088
14 Claims. (Cl. 137—625.62)

This invention relates in general to servo mechanisms, and in particular to electro-hydraulic servo valves, such as shown and described in our copending application, Serial No. 414,488, filed March 5, 1954 now Patent No. 2,897,792 issued Aug. 4, 1959.

An object of the invention is to provide a valve of the aforesaid type in which the electrical parts of the valve are sealed off from the fluid pressure chambers thereof.

Another object of the invention is to provide a valve as aforesaid which may be economically produced by high production methods.

Another object is to provide a valve as aforesaid having relatively few parts.

Moreover, our device is one in which all adjustments may be made from the exterior thereof and while the device is under fluid pressure.

The above objects and advantages have been accomplished by the device shown in the accompanying drawings, of which:

FIG. 2 is a sectional plan view taken on line II—II of FIG. 1;

FIG. 3 is a similar view taken on line III—III of FIG. 1; and

FIG. 4 is an enlarged view showing the flapper disc and the front edge support therefor.

Figure 1:
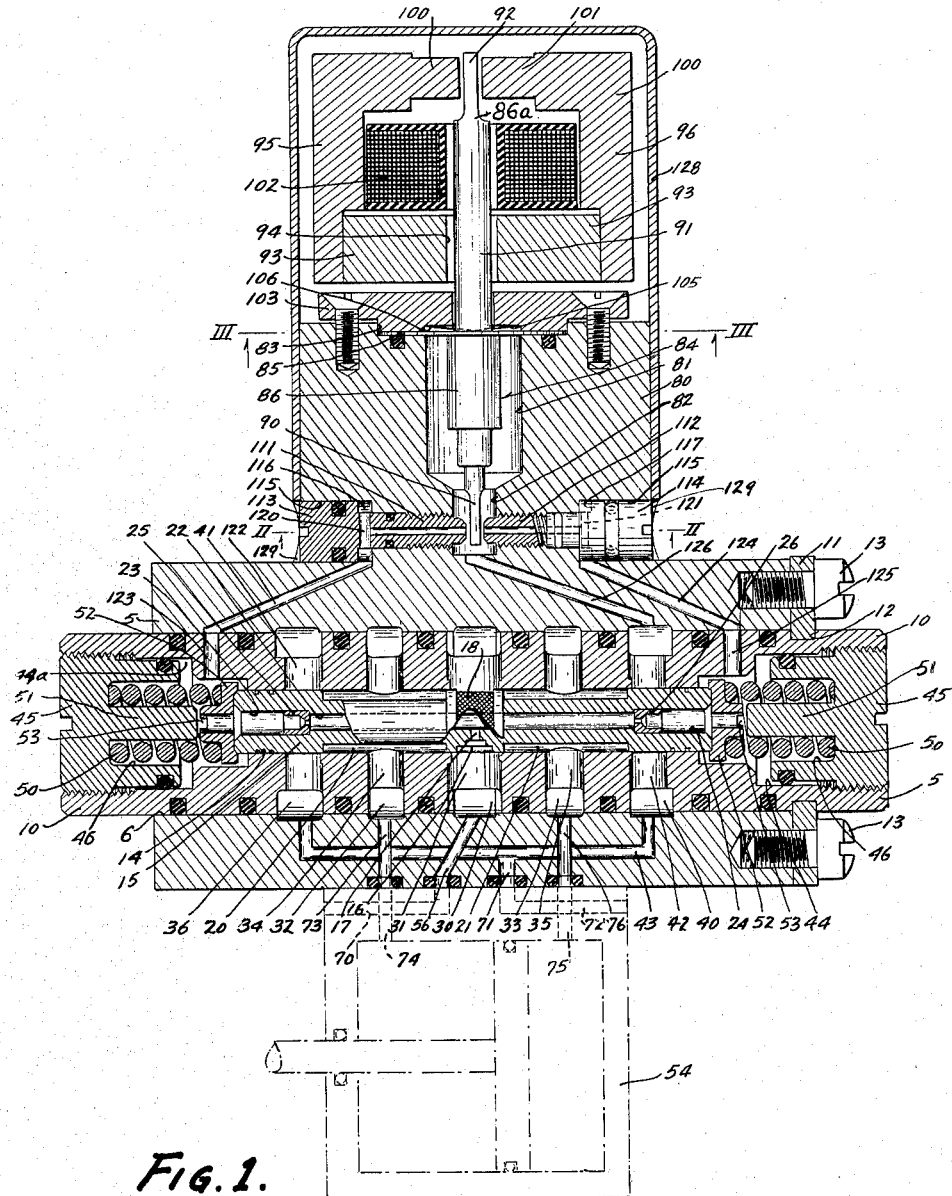
FIG. 1 is a vertical sectional elevation, somewhat in diagram, of our device.

Our device comprises a body 5 having a longitudinal bore 6 formed therein. A one-piece sleeve 10 is mounted within the bore of the body and is held in axially fixed relation therein by means of a retaining washer 11 which is mounted in a groove 12 formed in the sleeve and which is held in position by means of screws 13 passing through the washer and into the body. Suitable packing means are provided for sealing the joints between the sleeve and the bore of the casing and are located at all places where leakage is likely to occur.

The sleeve 10 is formed with an axial bore 14 in which is mounted a spool 15. The spool is formed with a centrally arranged pressure cavity 16 and with a longitudinal passage 22. One or more radial passages 17 serve to connect the cavity 16 with the longitudinal passage 22. The spool is also formed with two spaced flow cavities 20 and 21, arranged one on each side of the pressure cavity. A filter screen 18 is arranged about the pressure cavity to screen the fluid flowing to the spool. The spool is formed through its center with a longitudinal passageway 22 which terminates at one end in a counterbore 23 and at the opposite end in a counterbore 24. In the inner end of the counterbore 23 is arranged an orifice plug 25, and in the end of the counterbore 24 there is disposed an orifice plug 26.

The sleeve 10 is provided with a peripheral pressure groove 30 which is brought into communication with the pressure cavity of the spool by means of radial passageways 31. At one side of the peripheral groove 30 and in spaced relation therewith is a supply peripheral groove 32, and on the other side of the groove 30 there is formed a supply peripheral groove 33. These grooves are brought into communication, respectively, with the flow cavities 20 and 21 by means of radial passageways 34 and 35, respectively. Near one end of the sleeve there is formed a return peripheral groove 36, and at the opposite end of the sleeve a return groove 40 is formed. These return peripheral grooves are connected to the pressure chamber 14 of the sleeve by means of radial passageways 41 and 42, respectively. The return grooves 36 and 40 are connected together by means of a passageway 43 formed in the casing.

One end of the sleeve is formed with a pressure chamber 44 and the other end with a pressure chamber 44a, the outer end of each of which is screw-threaded and into which is mounted a screwthreaded plug 45. The plug is formed with a bore 46 in which is mounted a helical spring 50 preferably of nonferrous metal. Each of the plugs is made preferably of ferrous metal and an upstanding stud 51 is formed at the center of each which is magnetized, thereby providing a magnetic filter for the fluid flowing to the nozzles of our device. A spring supporting flange 52 is mounted within each end of the sleeve and bears against the adjacent end of the spool 15. The inner end of each of the springs 50 bears against the supporting flange. The plugs 45 are so adjusted that the springs are placed under tension thereby preloading the spool. The end of the surface of each of the supporting flanges adjacent the stud 51 is formed with a diametrically arranged slot 53 whereby passage of fluid will not be impeded.

As will be clear from FIG. 1, the radial passageways 31 of the pressure cavity 30 of the sleeve and flow cavities 20 and 21 of the spool are so spaced and proportioned that when the spool is in its neutral position, the radial passageways 34, 35, 41 and 42 will be covered and the only flow of fluid will be through the restricted opening of the orifice plugs 25 and 26 and through the nozzles 114 and 115 returning to the reservoir through passage 126, groove 40 and passageways 42, 43, 71 and 72. The body 5 is formed with a supply passageway 56 which extends from the pressure groove 30 through the casing and communicates with a supply passage 70 formed in the actuator 54 which is controlled by our device and which is shown in FIG. 1 by dot-and-dash lines. The return passageway 43 is connected by means of passageway 71 to the outlet passageway 72 formed in the actuator and which is in communication with the reservoir (not shown). The supply groove 32 of the sleeve is connected to the actuator passageway 74 at one end of the actuator cylinder by means of power passageway 73, and the actuator passageway 75 at the other end of the actuator cylinder is connected to the supply groove 33 by means of a power passageway 76 formed in the body.

Carried by the body 5 is a laterally extending body portion 80 which supports a flapper valve assembly 84. This body portion is formed with a cylindrical recess 81 having a reduced inner end 82. The flapper valve assembly comprises a flexible disc 85 which is mounted within a recess 83 formed in the outer end of the body portion 80, thereby closing the outer end of the recess 80, a suitable gasket being placed beneath the disc to hermetically seal the recess. The flapper valve has a flapper portion 86 extending inwardly into the cylindrical recess 81, below the disc and it is formed with a flapper tip 90 which is provided with opposite parallel flat surfaces. The flapper assembly is formed above the disc with an armature portion 91 which terminates at its free end in an armature 92 having flat opposite parallel sides, said armature 92 and said portion 91 being interconnected by means of the integral connection at 86a. Centrally supported above the body portion 80 is a permanent magnet 93 formed with an aperture 94 for the passage of the armature portion 91 of the flange assembly, the aperture being sufficiently large to permit lateral movement of the armature portion. The permanent magnet is provided with upwardly extending legs 95 and 96 having pole pieces 100 and 101 in spaced relation with the flat armature 92. An electro-magnet 102 is mounted above the permanent magnet 93 and is disposed between the legs thereof. Mounted over the disc 85 of the flapper assembly is a fulcrum plate 103 which is formed with a central recess 104 having its bottom surfaces 105 and 106 inclined upwardly from the diametrical center of the recess thereby forming a fulcrum for the disc. In order to assist in maintaining the flapper assembly substantially in its neutral position, a flat surface 110 is formed on the bottom of the plate which unites the inclined surfaces 105 and 106 thereof. The plate is securely held in position by means of suitable screws, thus clamping the disc 85 against the underlying gasket and sealing the disc to the body portion 80. The disc 85 is soldered or otherwise made integral with and in fluid sealing relation to the flapper portion 86; and hence the bore 94 and the magnet containing chamber is fluid-sealed relative to the chamber 81. Thus, hydraulic fluid entering the chamber 81 from the spool valve central system is prevented from entering the magnet containing chamber. Consequently, the possibility of magnetic particle contamination of the motor of the unit is precluded.

Arranged preferably in the body portion 80 of the device are two oppositely arranged nozzles 111 and 112. These nozzles which are formed with heads 113 and 114, respectively, are preferably screwthreaded into the body portion whereby they may be adjusted. The heads are mounted within suitable bores 115, and are somewhat shorter than the length of the bores whereby recesses 116 and 117 are provided. The head 114 of the nozzle 112 is formed with a diametrically arranged passage 120 and the head 113 of the nozzle 111 is formed with a diametrical passage 121. The body is formed with a supply passage 122 which communicates at one end with the diametrical passage 120 of the nozzle 111 and at its opposite end with a passage 123 formed in the sleeve. The passage 123 is in communication with the pressure chamber 44a of the sleeve. In like manner, a passage 124 is formed in the body and has its upper end in communication with the diametrical passageway 121 of the nozzle 112, and its opposite end is in communication with a passage 125 formed in the sleeve which is in communication with the pressure chamber 44. The body is also formed with a relief or return passage 126 having its upper end in communication with the bore 82 of the portion 80 and its lower end in communication with the peripheral groove 40 of the sleeve, whereby fluid from the bore 82 will be returned to the reservoir (not shown) through the passage 43 and passages 76 and 72. A casing 128 is provided for covering the magnet and is secured to the body portion 80 by any suitable means, aperture 129 being provided opposite the heads of the nozzle. As shown in FIG. 1, the armature 84 is in its neutral position and flapper tip unit 90 is spaced from each of the nozzles 111 and 112 thereby permitting fluid to bleed from both nozzles.

As is well known, the electromagnetic coil 95 has two separately energized windings, and the flapper assembly 84 is moved upon its fulcrum 110 laterally in either of the two directions thereby moving the flapper tip 90 into contact with either of the nozzles 111 or 112 in a manner described in our copending application.

As hereinbefore described, the spool 15 is shown in FIG. 1 in its neutral position, in which position fluid pressure will exist only in supply passage 56, the peripheral supply groove 30, the radial passageways 31, pressure cavity 16, longitudinal passage 22 of the spool, orifice plugs 25 and 26, counterbores 23 and 24, sleeve passageways 123 and 125, 122 and 124 to the nozzles 111 and 112, respectively. The fluid will, therefore, bleed from the nozzles substantially equal amounts and the spool will be retained in neutral position by the preloading springs 50. When, however, the flapper tip 90 of the flapper assembly is actuated through the electromagnetic coil 102, for instance, to contact the nozzle 112, flow of fluid through this nozzle unit, therefore, be stopped and the pressure will be built up in the pressure chamber 44. This increased pressure will serve to move the spool to the left of FIG. 1, uncovering the supply radial passages 31 and permitting fluid under pressure to enter the flow cavity 21, radial passages 35, peripheral groove 33 and be conducted to the right hand side of the piston of the actuator through passages 76 and 75, thus serving to move the piston of the actuator to the left. When the spool is in the above mentioned position, fluid from the left hand side of the actuator piston will be received by the flow cavity 20 through passages 74 and 73 and forced out through radial passages 34 and 41 and respective peripheral grooves 32 and 36 and returned to the reservoir through return passages 43, 71 and 72.

When the flapper valve is actuated to close nozzle 111, pressure will be built up in passages 122, 123 and pressure chamber 44a, thereby serving to move the spool to the right. As a result of such movement, the flow cavity 20 will be brought into communication with the pressure radial passages 31 and groove 30 permitting fluid under pressure to flow into the flow cavity 20 and pass out of the sleeve through radial passages 34 and supply groove 32 and thence to the left hand side of the actuator cylinder through passages 73 and 74 serving to move the piston thereof to the right. During such actuation the flow cavity 21 which is in communication with the peripheral groove 33 and radial passageways 35 will receive the fluid on the reverse side of the piston and cause it to be brought into communication with the radial passages 42 and peripheral groove 40 through the flow cavity 21 and return to the reservoir (not shown) through passages 43, 71 and 72.

A normal flow of fluid through the nozzles when the flapper unit of the armature assembly is in neutral position is restricted by the orifice plugs 25 and 26. The fluid as it passes into and through the pressure chambers 44 and 44a passes through a field of magnet flux created by the magnetic stud 51 of each of the caps 45, and metallic particles are, therefore, filtered out of the fluid stream.

We claim:

1. A pilot valve for control of a servo valve of the type comprising a body having a longitudinal bore, a spool reciprocally mounted in said bore and formed with interconnected passages and ports, and a pressure chamber at each end of the spool, said pilot valve comprising two oppositely arranged nozzles carried by said body each in communication with one of said pressure chambers, a flexible disc carried by said body in fluid-sealed relation therewith, a flapper valve assembly carried by said disc in fluid-sealed relation therewith, said assembly having a flapper portion in fluid-sealed relation with said disc and formed with a substantially flat tip disposed between said nozzles for oscillating movement relative thereto, means associated with said assembly for maintaining said flapper tip normally spaced from each nozzle, and electromagnetic motor means on the side of said disc opposite from said flapper portion for biasing said tip toward either of said nozzles.

2. A pilot valve for control of a servo valve of the type comprising a body having a longitudinal bore, a one-piece sleeve mounted within said bore, a spool reciprocally mounted in said sleeve and formed with interconnected passages and ports, and a pressure chamber at each side of the spool, said pilot valve comprising two oppositely arranged nozzles carried by said body each in communication with one of said pressure chambers, each of said nozzles having a screw-threaded head movably disposed in said body for external adjustment of said nozzles, a flexible disc carried by said body in fluid-sealed relation therewith, a flapper valve assembly carried by said disc, said assembly having a flapper portion in fluid-sealed relation therewith and formed with a substantially flat tip disposed between said nozzles for oscillating movement relative thereto, means associated with said assembly for maintaining said flapper tip normally spaced from said nozzle, and electromagnetic motor means on the side of said disc opposite from said flapper portion for biasing said tip toward either of said nozzles.

3. A pilot valve for control of a servo valve of the type comprising a body having a longitudinal bore, a spool reciprocally mounted in said bore and formed with interconnected passages and ports, and a pressure chamber at each side of the spool, said pilot valve comprising two oppositely arranged nozzles carried by said body each in communication with one of said pressure chambers, a flexible disc carried by said body in fluid-sealed relation therewith, a flapper valve assembly carried by said disc and formed with a flapper portion in fluid-sealed relation with said disc, said flapper portion being mounted in said body portion and subject to valve fluid pressure, said flapper portion being formed with a substantially flat tip disposed between said nozzles for oscillating movement relative thereto, said flapper valve assembly having an armature portion extending outwardly from said disc and subject to atmospheric pressure, a permanent magnet arranged about said armature portion, an armature formed at the outer end of said armature portion and disposed between the poles of said permanent magnet, an electromagnet mounted adjacent the permanent magnet and surrounding said amature portion, whereby the flapper valve assembly may be biased toward either of the nozzles.

4. A pilot valve for control of a servo valve of the type comprising a body having a longitudinal bore, a spool reciprocally mounted in said bore and formed with interconnected passages and ports, and a pressure chamber at each side of the spool, said pilot valve comprising two oppositely arranged nozzles carried by said body each in communication with one of said pressure chambers, a flexible disc carried by said body in fluid-sealed relation therewith, a flapper valve assembly carried by said disc and formed with a flapper portion in fluid-sealed relation with said disc, a fulcrum plate carried by said body and engageable with said disc to clamp the latter to the body in fluid-sealed manner, said plate having a substantially V-shaped, diametrically arranged knife edge for tilting support of said flapper valve assembly, said flapper portion being formed with a substantially flat tip disposed between said nozzles for oscillating movement relative thereto, means associated with said assembly for maintaining said flapper tip normally spaced from each nozzle, and motor means for biasing said tip toward either of said nozzles.

5. A pilot valve for control of a servo valve of the type comprising a body having a longitudinal bore, a spool reciprocally mounted in said bore and formed with interconnected passages and ports, and a pressure chamber at each side of the spool, said pilot valve comprising two oppositely arranged nozzles carried by said body each in communication with one of said pressure chambers, a flexible disc carried by said body, a flapper valve assembly carried by said disc and formed with a flapper portion in fluid-sealed relation therewith, a fulcrum plate carried by the body and arranged in clamping relation with said disc to hermetically seal the same to the body, said plate having a substantially V-shaped, diametrically arranged knife edge for tilting support of said flapper valve assembly, said knife edge having a restricted flat area to contribute to the maintenance of said assembly in neutral position, said flapper portion being mounted in said body portion and subject to valve fluid pressure, said flapper portion being formed with a substantially flat tip disposed between said nozzles for oscillating movement relative thereto, means associated with said assembly for maintaining said flapper tip normally spaced from each nozzle, and motor means for biasing said tip toward either of said nozzles.

6. A flapper valve for a servo valve of the character described having a body formed with a longitudinal bore, and reciprocating spool means mounted in the bore of said body and having each of its operating ends terminating in a pressure chamber, comprising a flexible disc carried by said body in fluid-sealed relation therewith, two oppositely directed nozzles carried by said body, each in communication with one of said pressure chambers, an oscillating flapper unit carried by said disc, said flapper unit being formed with a flapper portion in fluid-sealed relation with said disc and disposed between said nozzles, said unit being formed with an outwardly extending armature portion carried by said disc in fluid-sealed relation therewith, means for biasing said flapper to neutral position relative to said nozzles, and motor means for variably counteracting the force of said biasing means and causing the flapper to be selectively drawn into throttling relation with either of said nozzles.

7. A flapper valve for a servo valve of the character described having a body formed with a longitudinal bore, and reciprocating spool means mounted in the bore of said body and having each of its operating ends terminating in a pressure chamber, comprising a flexible disc carried by said body in fluid-sealed relation therewith, two oppositely directed nozzles carried by said body, each in communication with one of said pressure chambers, an oscillating flapper unit carried by said disc, said flapper unit being formed with a flapper portion in fluid-sealed relation with said disc and disposed between said nozzles, said unit being formed with an outwardly extending armature portion carried by said disc in fluid-sealed relation therewith, a permanent magnet for biasing said flapper valve toward neutral position, and an electromagnet for variably counteracting the forces of said permanent magnet and causing the flapper to be selectively drawn into throttling relation with either of said nozzles.

8. In a servo valve unit, a nozzle for controlling a variable pressure by the rate of flow of fluid therethrough, a flapper arranged to restrict the flow from said nozzle, a torque motor having an armature on which magnetic forces are exerted in response to differential current inputs to the motor, a diaphragm serving as a hinge support for the flapper intermediate of its ends and isolating said torque motor from fluid discharging from the nozzle, and means external of said diaphragm and operatively interconnecting the armature of said torque motor with said flapper so that by applying various differential currents to the motor at will, responsive forces will be applied to the flapper to correspondingly vary the restriction to flow from the nozzle.

9. In a servo valve unit, a flapper, a torque motor having an armature on which magnetic forces are exerted in response to differential current inputs to the motor, a diaphragm serving as a hinge support for the flapper intermediate of its ends and isolating said torque motor from one end of the flapper, and means external of said diaphragm with respect to said end of the flapper and operatively interconnecting the armature of said torque motor with said flapper so that by applying various differential currents to the motor at will, responsive forces will be applied to the flapper.

10. A pilot valve for control of a servo valve of the type comprising a body having a longitudinal bore, a spool reciprocally mounted in said bore and formed with interconnected passages and ports, and a pressure chamber at each end of the spool, said pilot valve comprising two oppositely arranged nozzles carried by said body each in communication with one of said pressure chambers, a flexible member carried by said body in fluid-sealed relation therewith, a flapper valve assembly carried by said member in fluid-sealed relation therewith, said assembly having a flapper portion in fluid-sealed relation with said member and formed with a substantially flat tip disposed between said nozzles for oscillating movement relative thereto, means associated with said assembly for maintaining said flapper tip normally spaced from each nozzle, and motor means on the opposite side of said member from said flapper portion for biasing said tip toward either of said nozzles.

11. In an electrically operated servo valve, the combination comprising a polarized electrical force motor section including spaced pole pieces, a rigid armature member movably arranged between said pole pieces, a flexure member mounting said armature member and permitting pivotal movement thereof, and a fluid section including fluid flow means operatively responsive to the pivotal movement of said armature member, said flexure member sealing said motor section from said fluid section.

12. A pilot valve for control of a servo valve of the type comprising a body having a longitudinal bore, a spool reciprocally mounted in said bore, and a pressure chamber at each end of the spool, said pilot valve comprising two oppositely arranged nozzles carried by said body each in communication with one of said pressure chambers, a flexible member carried by said body in fluid-sealed relation therewith, a flapper valve assembly carried by said member in fluid-sealed relation therewith, said assembly having a flapper portion in fluid-sealed relation with said member and formed with a substantially flat tip disposed between said nozzles for oscillating movement relative thereto, means associated with said assembly for maintaining said flapper tip normally spaced from each nozzle, and motor means on the opposite side of said member from said flapper portion for biasing said tip toward either of said nozzles.

13. A pilot valve for control of a servo valve of the type comprising a body having a longitudinal bore, a spool reciprocally mounted in said bore, and a pressure chamber at each end of the spool, said pilot valve comprising two oppositely arranged nozzles carried by said body each in communication with one of said pressure chambers, a flexible member carried by said body in fluid-sealed relation therewith, a flapper valve assembly carried by said member in fluid-sealed relation therewith, said assembly having a flapper portion in fluid-sealed relation with said member and formed with a substantially flat tip disposed between said nozzles for oscillating movement relative thereto, and an electrical force motor means for biasing said tip toward either of said nozzles, said electrical force motor having spaced pole pieces providing a magnetic gap therebetween, said magnetic gap being on the side of said flexible member opposite said flapper portion and sealed from said fluid by said member.

14. In an electrically operated servo valve, the combination comprising a polarized electrical force motor section including spaced pole pieces providing a magnetic gap, a rigid armature member movably arranged between said pole pieces and including a portion positioned in said magnetic gap, a flexure member mounting said armature member and permitting pivotal movement thereof, and a fluid section including fluid flow means operatively responsive to the pivotal movement of said armature member, said flexure member sealing said magnetic gap from said fluid section.

References Cited by the Examiner
UNITED STATES PATENTS

| | | | |
|---|---|---|---|
| 1,992,048 | 2/35 | Temple | 137—82 |
| 2,625,136 | 1/53 | Moog | 251—30 |
| 2,655,939 | 10/53 | Tauscher | 137—623 |
| 2,655,940 | 10/53 | Jackson | 137—623 |
| 2,767,689 | 10/56 | Moog. | |
| 2,775,254 | 12/56 | Stanbury | 137—83 |

FOREIGN PATENTS

| | | |
|---|---|---|
| 562,645 | 7/44 | Great Britain. |
| 712,329 | 1954 | Great Britain. |

ISADOR WEIL, *Primary Examiner.*

KARL J. ALBRECHT, *Examiner.*